United States Patent [19]

Taniguchi

[11] 4,098,428
[45] Jul. 4, 1978

[54] TANK FOR PITCH IMPREGNATION THEREIN

[75] Inventor: Toru Taniguchi, Kyoto, Japan

[73] Assignee: Nikku Industry Co., Ltd., Itami, Japan

[21] Appl. No.: 833,749

[22] Filed: Sep. 12, 1977

[30] Foreign Application Priority Data

Jan. 8, 1977 [JP] Japan .................................. 52-957

[51] Int. Cl.[2] ............................................ B65D 45/32
[52] U.S. Cl. ..................................... 220/319; 220/256
[58] Field of Search ................................ 220/256, 319

[56] References Cited

U.S. PATENT DOCUMENTS

| 3,753,853 | 8/1973 | Schabert | 220/256 X |
|---|---|---|---|
| 3,800,972 | 4/1974 | Raymond | 220/256 X |
| 3,990,605 | 11/1976 | Hanke et al. | 220/319 X |

*Primary Examiner*—George T. Hall
*Attorney, Agent, or Firm*—Armstrong, Nikaido, Marmelstein & Kubovcik

[57] ABSTRACT

A horizontal-type tank for therein operating heated pitch impregnation of carbon electrode blanks, comprising a cylindrical body having an annular weir member disposed near its open end portion for preventing flowing out of an unused pitch portion, and a lid member releasably closing the opening of the body, which has a double wall structure providing between the outer and the inner walls a heated pitch jacket in liquid communication with the body, said inner wall having an outer edge portion protruding into the body beyond the location of the weir member. The body also has an annular coolant jacket disposed close to its flange surface portion against which an annular seal member provided to a flange portion of the lid abuts.

5 Claims, 3 Drawing Figures

TANK FOR PITCH IMPREGNATION THEREIN

BACKGROUND OF THE INVENTION

This invention concerns an improved structure of tank devices of the type horizontally installed and utilized in operating impregnation of heated and melted pitch therein. More particular the invention relates to an improved structure of the lid member and the sealing arrangement for such tank device.

Today a wide use is made of carbon electrodes for example in the electric furnace for steel making or in many other heating apparatus for various purposes, and with carbon electrodes used in electric furnaces in particular, instances are observed in which electrodes are so large in size as to have a diameter in the order of from 50 cm to 150 cm.

In the manufacture of such carbon electrodes, particles of a carbon material such as coke or the like blended with a binder material so as to impart a viscosity thereto are extruded to a rod like product and subjected to a high temperature application to there obtain a blank electrode. The blank electrode thus obtained, which is porous, has an only insufficient strength and cannot stand for use in an electric furnace, per se. Therefore, in order to manufacture a product electrode having desirable characteristics such as a sufficient rigidity and capacity for a large electric current density, it is known and practised to subject the blank electrodes to a pitch impregnation treatment, which generally is worked with use of a horizontally disposed tank device. Pitch impregnation tanks or pitching tanks under consideration normally comprises a cylindrical body portion and a lid member releasably secured to the open side end of the body or two lid members respectively disposed at each open end of the body if the latter is open at both ends.

In operation of the pitching treatment, as soon as blank electrodes are conveyed into the pitching tank, as received on a palette and heated in a hot air furnace at a temperature above the melting point of pitch, deaeration will be operated to there provide a vacuum condition within the tank, followed by charging into the tank of pitch melted and maintained at a high temperature. Whereas when the pitch impregnation is complete after the lapse of the prescribed length of time a predominant portion of the charge of pitch has become impregnated into blank electrodes, it usually occurs that a fair amount of pitch is permitted to still remain within the tank. Accordingly, in taking out the pitched blank electrodes from the tank, it is usually operated to first remove away the portion of pitch unused or unabsorbed in the electrode blanks and remaining present in the tank.

A difficulty is indicated in this connection that with the current tank apparatus hardly feasible is to completely remove away such an unused pitch portion as attached about the inside surface of the tank or about the surfaces of the pitched elecrode blanks. Unused surplus portions of pitch, amount of which is fairly great when all are collected together, tend to flow out of the tank upon opening of the lid and pollute the floor of the workroom.

Another difficulty indicated is that whereas upon opening of the tank the surplus or unused portion of pitch flows down gradually along the surfaces of flange portions formed of both the tank body and the lid, if said flange portions are not manintained at a sufficiently high temperature it occurs that the surplus pitch portion becomes gradually attached and hardened about the flange portions and the seal member such as an O-ring as well; if it occurs, not only the seal member is permitted to undergo a local deformation or other damages caused by the hardened portion of pitch but also made difficult is to have the tank satisfactorily shut by the lid for a next pitching operation cycle, and it inconveniently is unavoidable to conduct a manual cleaning operation of the tank at each time of the opening of the tank lid, for removing the pitch portion tending to attach and harden about flange surface portions.

A still another difficulty, which has derived from a recent tendency in this field of art to employ a higher temperature than before for heating pitch so as to enhance the pitch impregnation efficiency, resides in that cases are encountered oftener today than before in which the temperature of heated pitch exceeds the allowable temperature of the material for the seal member, whereby made more difficult today is to provied a satisfactory seal between the tank body and its closing lid.

SUMMARY OF THE INVENTION

The present invention has as its primary object to overcome these and other difficulties indicated in connection with the existing tank apparatus by providing an improved tank structure, with which the portion of pitch permitted to remain within the tank can be effectively checked from flowing out of the tank onto the workroom floor.

A further object of the present invention is to provide an improved tank structure, of which the lid member can be prevented from cooling with ease upon opening of the tank, so that a hardening or hardened attachment of pitch can be avoided about the sealably effective surface area of the lid.

A still further object of the invention is to provide an improved tank structure, of which the seal member applied between the flange surfaces of the tank body and of the lid member can be effectively prevented from being heated above its allowable temperature limit.

To realize these and other prescribed objects, the present invention proposes to provide to a cylindrical tank structure an annular weir member which is provided near the open end portion of the body. Further, with the tank device in accord with the present invention, the lid member has a double wall structure, forming a jacket between the outer and the inner walls into which melted and heated pitch is introduced so that the portion of pitch tending to remain attached about the inner wall surface of the lid cannot solidify thereabout but can be allowed to flow down with ease. Also, the tank structure proposed in pursuance of the present invention includes as its another characteristic feature a cooling jacket, which is provided close to the surface of a flange portion of the body and through which a coolant solution is circulated to prevent the seal member from becoming heated above its allowable temperature.

These and other objects, features and advantages of the present invention will become clearly apparent as the specification proceeds to describe the invention with reference to a specific embodiment thereof illustrated in the accompanying drawings.

DESCRIPTION OF THE PREFERRED EMBODIMENT

Figure 1:
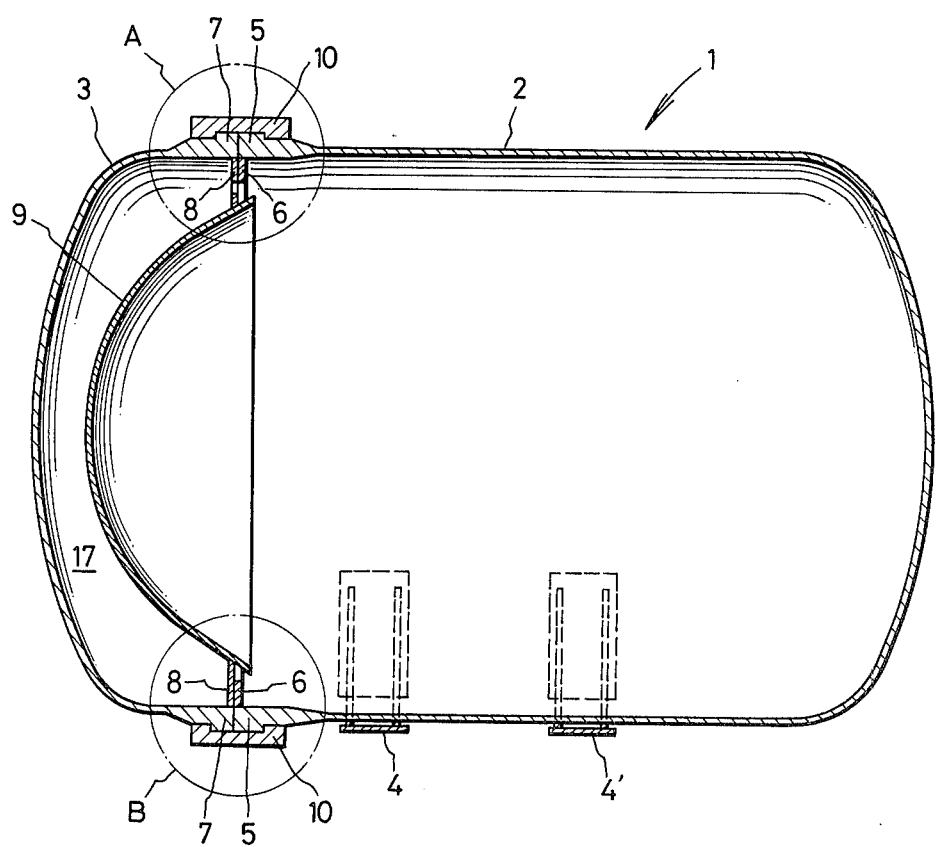
FIG. 1 is a longitudinal sectional view of the improved tank structure, embodying the concept of the present invention.

The preferred tank structure of this invention illustrated in FIG. 1 is therein generically indicated at 1, which broadly comprises a body portion 2 and a lid member 3 releasably closing the body.

The body 2, which is cylindrical in the illustrated embodiment, is open at its one end and has a closed bottom at its other end. For horizontal installation of the tank, brackets 4 and 4' are provided at lower portions of the body portion, which also has at its open end portion a flange portion 5 formed about its outer periphery and a weir member 6 provided about its inner periphery. The annular weir member 6 can effectively prevent pitch from flowing out of the tank, if an unused portion thereof be permitted to remain within the tank after removal of a pitched product.

The lid member 3, which comprises an outer wall and an inner wall, has about its outer wall an annular flange portion 7 corresponding to and abuttingly engageable with the flange 5 of body 2, and has an annular vertical wall 8 disposed between the outer and the inner walls, of which the latter indicated at 9 has a bowl-like configuration, which functions as a pitch collector member. About the outer periphery of flange portions 5 and 7 respectively of body 2 and lid 3, a fastening ring member 10 is applied in shutting the body with the lid. For fastening the portions 5 and 7 with the ring 10, a same mechanism as employed in the cases of fire hose coupling may be effectively relied on, or said portions 5 and 7 and said ring 10 may be suitably engageably threaded in a manner such that when the ring 10 is rotated for example a quater or a half of a rotation the lid 3 can be sealably fastened to the body 2.

Figure 2:
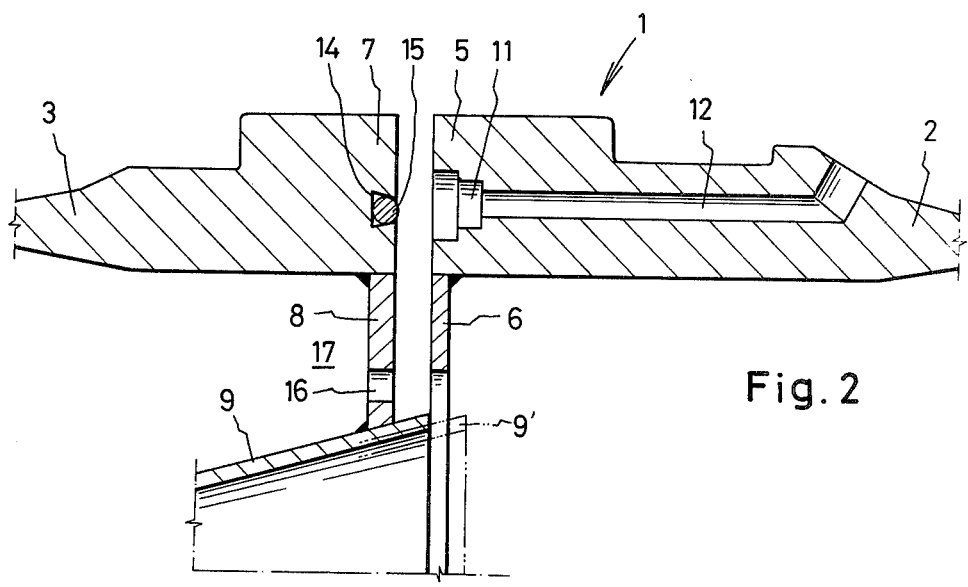
FIG. 2 shows an enlarged view of the portion A of FIG. 1.

In the enlarged view taken in FIG. 2, in which the ring 10 is dropped for simplicity in illustration, an annular coolant jacket or groove 11 is provided in the vicinity of the vertical end surface of flange 5 of body 2. The numerical symbol 12 denotes a coolant discharge conduit, which is connected at a high position of the tank to jacket 10, in liquid communication with the jacket.

In FIG. 3, in which again the ring 10 is dropped from illustration, the numeral 13 represents a coolant supply conduit, which is connected to jacket 10 at a low position of the tank and is in liquid communication with the jacket.

Figure 3:
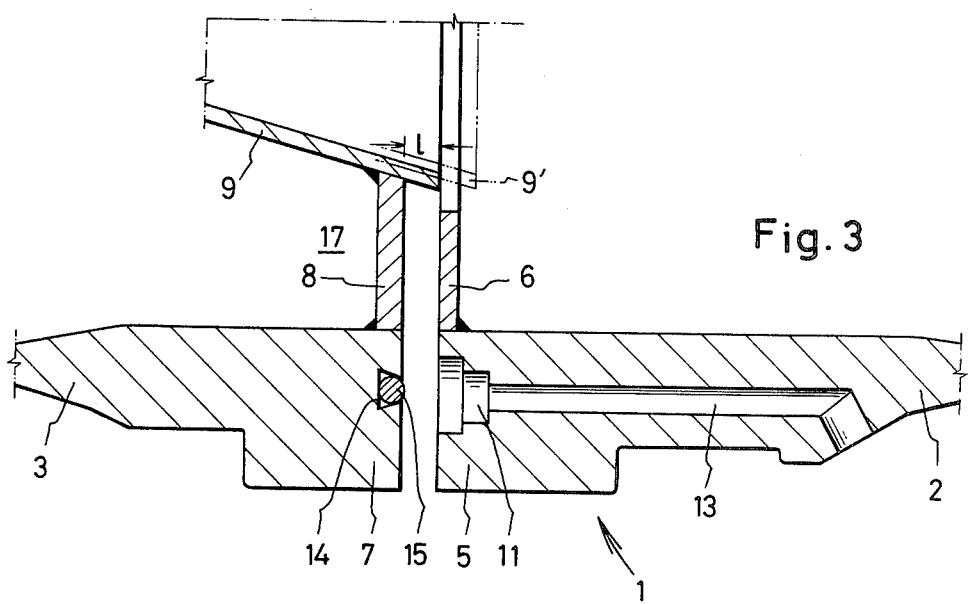
FIG. 3 similarly is an enlarged view of the portion B of FIG. 1.

As illustrated in the left-hand halves of each of FIGS. 2 and 3, the flange portion 7 of lid member 3 has an annular groove 14 provided at a portion of its vertical end surface, and within the groove 14 a seal member such as O-ring 15 is received. Further, the annular vertical wall 8 disposed connecting a bottom surface portion of flange 7 and an upper surface portion of the inner wall or pitch collector member 9 of lid 3 has at an upper portion thereof a perforated bore 16, through which a portion of the pitch charged into the tank body flows into a cavity of jacket 17 provided by the outer and inner walls and the vertical wall 8 of the lid member 3.

The pitch collector member 9 has an annular edge portion projecting a length 1 beyond the vertical edge of flange 7, forming a pitch-flow guid portion which, as said flange 7 is brought closer to flange 5 of tank body 2 in closing the tank, becomes gradually nearer to the position shown by phantom lines 9 in FIGS. 2 and 3.

In operating the pitching treatment with use of the tank apparatus of the invention, carbon electrode blanks which were suitably disposed on a palette and heated in a furnace as before mentioned will be conveyed into the tank 1. Subsequent to closing the tank opening with lid 3, deaeration of the interior of tank is operated to there provide and maintain a vacuum condition within the tank to an extent at which a satisfactory removal is met of the air and gas originally contained in the porous electrode blanks.

Whereas charging of melted pitch is then made into the tank, the jacket 17 of lid member 3 is communicated with the body portion 2 through bore 16, so that the pitch charged into the tank can flow into the jacket, whereby the lid member 3 per se can be effectively maintained at a high temperature, substantially the same as the body portion.

When a sufficient pitch impregnation under an elevated pressure is complete after the lapse of the prescribed length of time, the portion of pitch remained as not absorbed in the blank electrodes or the unused pitch portion will be suitably remove by for example suction. In this connection, if a substantial portion of pitch remaining present within the tank can be discharged relatively with ease, it is not necessarily done with ease to completely removed away the pitch portion attached about the inner wall surface of the tank and the surfaces of the pitched electrodes as before mentioned, and with the tank devices today in use, flowing out of pitch onto the workroom floor and pollution thereof is virtually unavoidable.

With the improved tank structure in accordance with the present invention, such flowing out of pitch is checked at the weir member 6. Further, pitch portions tending to attach about the inner surface of wall 9 of lid 3 are permitted to gather along said surface and flow down from the projected edge portion of said wall 9 into the tank body portion in the vicinity of but inside of the weir member 6. Thus, with the tank of the invention, pollution of the workroom floor is prevented.

Normally, when the lid 3 is removed from the body to open the tank, its inner surface will easily undergo a rapid cooling caused mainly through its contact with the ambient air. If this occurs, solidification of pitch will take place about the surface of vertical edge portion of the flange 7 and in the vicinity of the seal member 15. The improvement made by the present invention in this respect consists in the provision of jacket 17 and storage therein of heated and melted pitch. If pitch was originally heated at a temperature suitably above its melting point, it is feasible to maintain the lid member at a temperature above the melting point of pitch. Additionally, with the body portion 2 of the tank per se, this can be suitably heated externally or heat insulated, and in addition it has a great thermal capacity. Therefore, hardening of pitch about for example the surface of flange 5 may be dropped from a particular consideration.

The present invention also proposes an improvement relative to protection of the seal member. As shown in FIGS. 2 and 3, the flange 5 of body 2 is provided with the annular groove 11 near its vertical surface onto whith the seal member 15 abuts. A coolant solution, which is supplied through the lower supply conduit 13, undergoes vaporization within the groove 11, cooling said vertical surface portion of flange 5 and the seal member 15 abutting thereonto, and is discharged through the upper conduit 12, whereby the sealing member 15 is maintained at a temperature within a range not causative of a deterioration of same.

Although in the illustrated embodiment of the present invention, the inner wall or pitch collector member 9 is formed in an arc configuration in section, this is in consideration of an elevated pressure condition present within the tank, and if required, this member 9 may be formed in a flat plate configuration having a pitch-flow guide portion extended from the vertical wall 8 and projecting beyond the weir 6 toward interior of the body 2.

Also, it may be well devised to provide a bore to wall 8 at a lower position of the tank in order to facilitate removal of the pitch portion received within the jacket 17. Similarly, the illustrated lid member may be modified to have a suitable heating device provided thereto so that in case of hardening of pitch at any inside surface portion of its outer wall member, suitable heat application can be made to have the hardened pitch melted. Normally however, the hardened pitch portion, if any within the jacket, can easily undergo melting when a next charge of heated pitch is made into the tank so that provision of a particular heating system to the lid member can be well dispensed with.

Whereas in this specification no reference is made to such as a method for heating the tank, piping details for the deaeration or vacuum generating system, arrangements for supplying and discharging melted pitch and for circulation of coolant solution, control systems and so forth, particulars as to these matters are believed to be obvious to those skilled in the art, and any known methods and systems may be relied on in this respect. It will also be apparent and obvious to provide rails for thereon guiding the palettes into the tank or provide an auxiliary pitch tank so that carbon electrode blanks can be constantly immersed in melted pitch.

It is claimed:

1. A horizontally installed tank in which to operate heated pitch impregnation, comprising a body portion having at least one open end and a lid member to sealably close said open end of the body, said body having an inner weir member provided about its open end portion for preventing the unused portion of pitch from flowing out of the tank, said lid member comprising a double wall structure providing between the outer and the inner walls a cavity for receiving melted pitch therein, said lid member having with respect to its inner wall a pitch-flow guide portion protruding toward inside of the body beyond the location of its weir member when said lid member is in condition to close the opening of the body.

2. A horizontal tank for use in heated pitch impregnation as claimed in claim 1, wherein said body and said lid members respectively have a flange portion provided about the abuttingly engageable edge portions thereof, said flange portions respectively having an outwardly projected portion about the outer periphery thereof, and wherein a fastening ring member is provided, engageable with said projected portions of the body and the lid to releasably securely attaching the lid to the body.

3. A horizontal tank for use in heated pitch impregnation as claimed in claim 1, wherein said inner wall of the double structure of lid member comprises a pitch collector member of a bowl-like configuration having an outer peripheral edge portion protruding toward inside of the body beyond the location of its weir member when said body is closed with the lid.

4. A horizontal tank for use in heated pitch impregnation as claimed in claim 1, wherein said inner wall of the lid member comprises an annular vertical wall member and a bowl-like pitch collector member disposed in the central opening of the former, said vertical wall member having a bore perforated at an upper portion thereof.

5. A horizontal tank for use in heated pitch impregnation as claimed in claim 1, wherein said tank is a cylindrical one, said body has about its open end portion an annular flange portion provided near its vertical end surface with a coolant solution jacket, and said lid member similarly has about its open end portion an annular flange portion provided about its vertical end surface with an annular seal member, said seal member being disposed to about onto said vertical end surface of said body upon closure of the tank with the lid member.

* * * * *